Koontz

United States Patent [19]

[11] 4,254,86
[45] Mar. 10, 198

[54] LIFT AND CARRY ACCUMULATING CONVEYOR

[75] Inventor: Richard D. Koontz, Pontiac, Mich.

[73] Assignee: F. Jos. Lamb Company, Warren, Mich.

[21] Appl. No.: 43,255

[22] Filed: May 29, 1979

[51] Int. Cl.³ ............... B65G 25/00; B65G 43/08
[52] U.S. Cl. ............................. 198/751; 198/774
[58] Field of Search ............ 198/718, 751, 774, 460, 198/725, 776

[56] References Cited

U.S. PATENT DOCUMENTS 3,500,992   3/1970   Tabor .................................. 198/751

FOREIGN PATENT DOCUMENTS 1902698   8/1970   Fed. Rep. of Germany ........... 198/7

Primary Examiner—Robert B. Reeves
Assistant Examiner—Douglas D. Watts
Attorney, Agent, or Firm—Barnes, Kisselle, Raisch & Choate

[57] ABSTRACT

An accumulating conveyor of the lift and carry ty] includes a transfer bar having work carriers there programmed to engage and advance or bypass wor pieces resting on stationary rails by means of bell cran] which are engaged or bypassed in response to the po: tion assumed by workpiece sensing members at tl successive stations during that portion of the convey cycle when the workpiece transfer bar is elevated to li workpieces resting on the stationary rails.

9 Claims, 5 Drawing Figures

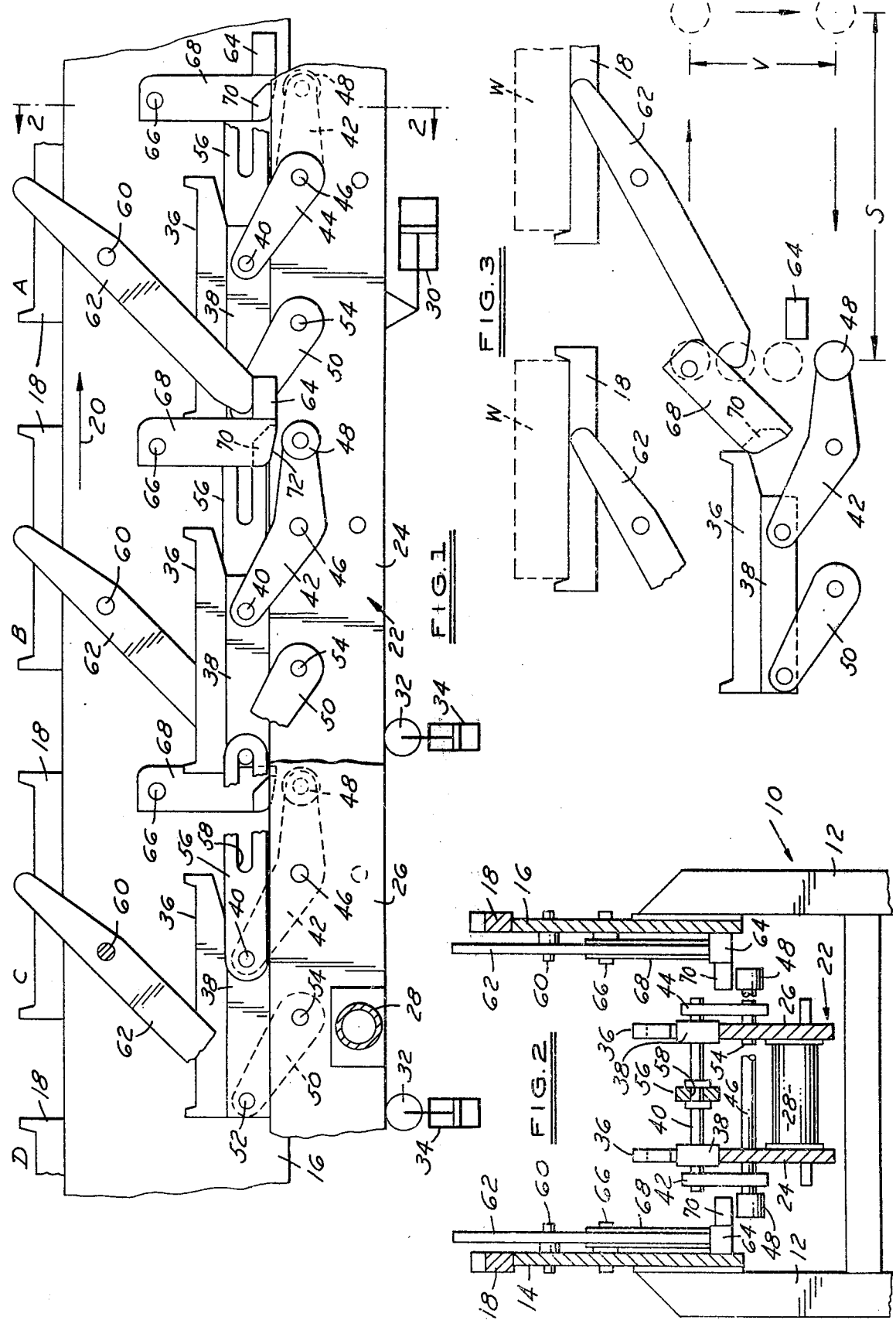

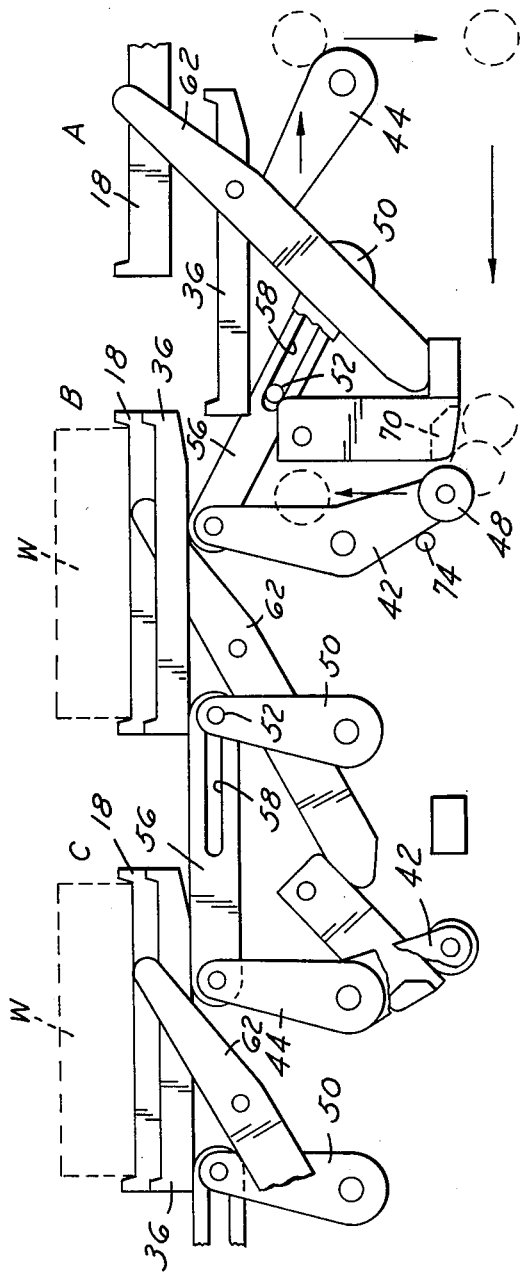
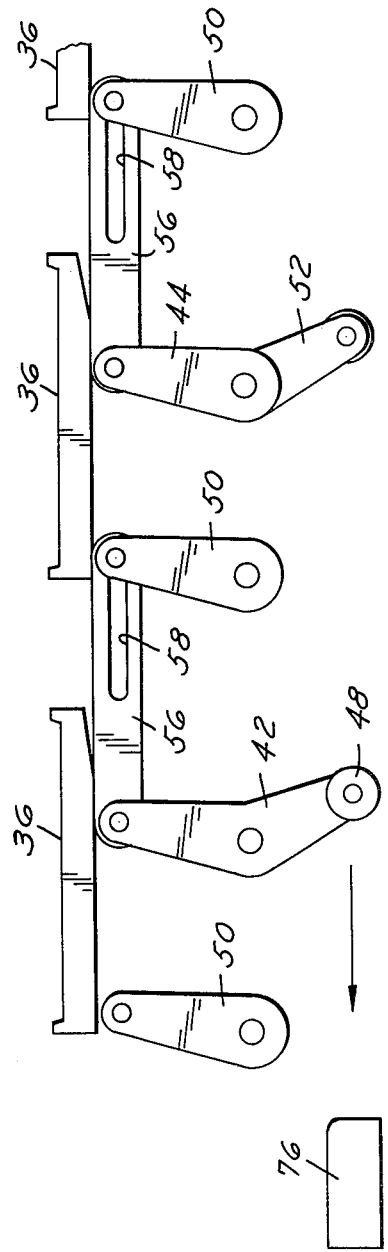

LIFT AND CARRY ACCUMULATING CONVEYOR

This invention relates to an accumulating conveyor of the lift and carry type.

Accumulating conveyors are used extensively in industry for maintaining a steady supply of workpieces for feeding automated machine tools. Such conveyors normally include a plurality of successive stations and are designed to advance workpieces cyclically to the next successive downstream station so long as any downstream station is empty; that is, not occupied by a workpiece.

Many types of workpieces cannot be conveyed by sliding them along support rails. Such workpieces are normally conveyed by lifting them from the support rails, advancing them, and then depositing them on the support rails at the next downstream stations. Conveyors of this type are frequently referred to as "lift and carry" conveyors.

Although several types of accumulating conveyors of the lift and carry type are presently used in industry, each normally has some characteristic disadvantage. Some are of very complicated and costly construction; others are not reliable for continuous operation over prolonged periods of time; still others require an unduly long time cycle of operation since a portion of the operating cycle is utilized merely for programming the transfer devices at each station to engage or bypass a workpiece.

The primary object of this invention is to provide an accumulating conveyor of the lift and carry type of relatively simple design which is reliable in operation and the time cycle of which is relatively short.

More specifically, the present invention contemplates an accumulating conveyor of the type referred to which includes a transfer bar reciprocated both vertically and horizontally to advance workpieces along a pair of stationary rails. Workpiece carriers on the transfer bar are programmed in a simple manner at each station to advance or bypass a workpiece whenever the transfer bar is raised to lift workpieces from the support rails. Thus, in accordance with the present invention, the programming of the carriers at each station is performed during the elevating motion of the transfer bar rather than by the actuation of other elements, such as a program bar, as an independent operation forming part of the total operating cycle of the machine.

Other objects, features and advantages of the present invention will become apparent from the following description and accompanying drawings, in which:

FIG. 1 is a fragmentary side elevational view of the conveyor, partly diagrammatic and with portions broken away;

FIG. 2 is a sectional view taken generally along the lines 2—2 in FIG. 1;

FIG. 3 is a view illustrating the action of the part sensing mechanism when each station of the conveyor is occupied by a workpiece;

FIG. 4 is a view illustrating the action of the part sensing mechanism when at least one station is empty and the elevating motion of the transfer bar is initiated; and FIG. 5 shows all of the workpiece carriers in the elevated position with the transfer bar lowered and about to be retracted.

Referring first to FIG. 2, the accumulating conveyor of the present invention includes a supporting frame 10 having laterally spaced upright legs 12 on which a pa of horizontally extending and laterally spaced suppo rails 14,16 are supported. At regularly spaced interva along the upper edges of rails 14,16 there are locate transversely aligned workpiece nests 18. The nests form a plurality of successive stations which are desi nated A, B, C and D in FIG. 1. In the arrangeme illustrated in FIG. 1 the workpieces are adapted to conveyed in a direction toward the right (downstreai as indicated by arrow 20. Thus, the endmost dow stream station illustrated is designated A and the en most upstream station illustrated is designated D.

Between the support rails 14,16 there is arranged transfer bar assembly 22 which includes a pair of lon tudinally extending transfer bars 24,26 interconnecte in fixed laterally spaced parallel relation by tubul spacers 28. Transfer bar assembly 22 is supported f both horizontal and vertical movement. A cylinder diagrammatically illustrates a means for reciprocatii the transfer bar assembly horizontally through a stro S (FIG. 3) which corresponds to the spacing betwe the successive stations. The means for raising and lo ering the transfer bar assembly through a vertical stro V (FIG. 3) are shown diagrammatically by rollers and cylinders 34.

Transfer bar assembly 22 supports a plurality of pai of workpiece carriers 36. The carriers 36 in each pa are aligned transversely and supported one on each the transfer bars in laterally spaced relation. Each ca rier 36 is fixedly mounted on a spacer 38, the spacers being aligned vertically in the planes of the two transf bars 24,26. A rotatable shaft 40 extends transverse through the forward (downstream) end of each spac 38. One end of each shaft 40 is connected to the upp end of a bell crank 42 and the opposite end of each sh; 40 is connected to the upper end of a link 44. A plurali of shafts 46 extend transversely through and are jot nalled in the spaced transfer bars 24,26 at regulai spaced intervals. Bell cranks 42 are fixedly connecte intermediate their ends to one end of each shaft 46 a the lower ends of links 44 are fixedly connected to t opposite end of each shaft 46. The lower end of ea bell crank 42 has a laterally outwardly extending ca follower roller 48 journalled thereon. As shown in FI 1, at the position corresponding to station A on t conveyor, bell crank 42 is mounted on the right side transfer bar assembly 22 and link 44 is mounted on t left side thereof. At the next successive upstream stati bell crank 42 is mounted at the left side and link 44 mounted at the right side of transfer bar assembly 2:

The upstream end of each spacer 38 is supported its associated transfer bar by a link 50. The upper er of links 50 in each pair are connected to the oppos ends of a shaft 52 which extends transversely throu the rear (upstream) ends of the spacer bars in each pa The lower end of each link 50 is pivotally supported its respective transfer bar by a pin 54. The success pairs of spacers 38 are connected together by bars The rear end of each bar 56 is pivotally connected shaft 40 and the forward end of each bar 56 is forn with a longitudinally elongated slot 58 through wh the shaft 52 extends.

It will be observed that links 50, links 44 and l cranks 42 form a series of parallelogram linkages tween the work carriers 36 and transfer bar assem 22. It will also be observed that, in response to clo wise movement of one of the parallelogram linka; the parallelogram linkages upstream thereof will li wise be rotated clockwise through the action of connecting bars 56. Thus, when one pair of carriers are elevated relative to the transfer bar assembly, all the carriers upstream thereof will also be elevated. However, because of slots 58 in bars 56, clockwise rotation of one parallelogram linkage will not elevate the carriers downstream thereof.

At each station there is pivotally supported, as by a pin 60, a workpiece sensing lever 62. The successive sensing levers 62 are arranged on alternate sides of the conveyor. Thus, sensor lever 62 at station A is pivotally supported on the inner side of support rail 14 and sensing lever 62 at station B is pivotally supported on the inner side of support rail 16. The lower end of each sensing lever 62 is normally supported on a stop block 64 fixed on the adjacent support rail and the upper end of each sensing lever normally projects upwardly beyond the nest 18 at the adjacent station. Adjacent each stop block 64 there is pivotally supported on the respective support rails 14,16, as at 66, a sear 68. Each sear 68 is provided at its lower end with a laterally inwardly extending cam 70. When all of the stations of the conveyor are empty and the transfer bar assembly 22 is in the lower retracted position, each cam follower roller 48 underlies a cam 70 on the sear 68 associated therewith and all the sears 68 are oriented vertically and abut against the rear faces of stop blocks 64. The lower faces 72 of cams 70 preferably incline slightly downwardly in downstream direction.

One complete cycle of the conveyor comprises the sequential actuation of cylinders 34 and 30 so that with the transfer bar assembly in the retracted position shown in FIG. 1 it is first elevated through the distance V by energizing cylinders 34, then advanced through the stroke S by actuation of cylinder 30, then lowered by actuating cylinders 34 in the opposite direction and finally retracted to the starting position by actuating cylinder 30 in the opposite direction. The alternate location on the opposite sides of the conveyor of the sensing levers 62, sears 68 and bell cranks 42 prevents interference between cam follower rollers 48 and the next successive cam 70 as would be the case if all of the bell cranks 42 and sears 68 were located on the same side of the conveyor.

The accumulating feature of the present conveyor is illustrated in FIGS. 3 and 4. In FIG. 3 a workpiece W is shown occupying each of the nests 18. When all of the nests are so occupied there is no need to advance any of the workpieces. When a nest is occupied by a workpiece W, the sensing lever 62 is rotated clockwise by the workpiece so that its lower end engages and swings sear 68 to the inclined position shown in FIG. 3. This displaces cam 70 out of the vertical path of travel of cam follower 48. Thus, when the transfer bar assembly 22 is raised by actuation of cylinders 34, the cam follower 48 progresses along the vertical path shown in phantom in FIG. 3 and the bell cranks 42 are not pivoted. If the bell cranks are not pivoted, then, when the transfer bar assembly is fully elevated, the carriers 36 have not been raised sufficiently to engage the workpieces at the next upstream stations and, therefore, all of the workpieces remain seated in their nests.

If the nest at station A (or any other station) is empty, the sensing lever 62 at that station pivots under the influence of gravity to the position shown in FIGS. 1 and 4. Then, when the transfer bar assembly is elevated, the cam follower 48 at the next upstream station engages the inclined lower face 72 of overlying cam 70 and is thereby displaced to the left as viewed in FIGS. 1 and 4 to rotate its associated bell crank 42 clockwise until the parallelogram linkage is in an over-center position and is rendered stable by means of a pin 74 against which the bell crank abuts.

As pointed out previously, the successive spacers 38 are interconnected by bars 56. Thus, when the carrier at station B is elevated by clockwise rotation of its parallelogram linkage, each of the successive upstream carriers will be swung upwardly and forwardly to the erected position shown in FIG. 4. Thus, when the transfer bar assembly is fully raised through the vertical distance V, the carriers at the stations upstream from station A will engage and lift all of the workpieces W from nests 18 at all stations upstream from an empty station. The workpieces so elevated are then advanced to the next successive downstream station when cylinder 30 is actuated to shift the transfer bar assembly to the right through the stroke S. Thereafter, when cylinders 34 are actuated in the opposite direction, the transfer bar assembly is lowered and the workpieces are deposited in the nests of the next downstream station. Then, when the lowered transfer bar assembly approaches its fully retracted position (FIG. 5), the endmost upstream cam follower 48 will contact a stop block 76 that is mounted on the adjacent support rail and thereby pivot all of the parallelogram linkages counterclockwise to the reset position illustrated in FIG. 1. All of the carriers which have been previously erected are thereby rocked to their lowered position resting on the two transfer bars through the action of the interconnecting bars 56.

I claim:

1. An accumulating conveyor of the lift and carry type comprising a stationary horizontally extending support having a series of successive stations spaced regularly therealong at which workpieces are adapted to be supported, transfer bar means extending lengthwise of said stations, means for reciprocating said transfer bar means vertically through a predetermined distance and horizontally through a distance corresponding to the spacing between successive stations, said reciprocating means being adapted to move the transfer bar means horizontally in a downstream direction when in raised position and horizontally in an upstream direction when in a lowered position, a series of work carriers supported on the transfer bar means by parallelogram linkages for bodily horizontal and vertical movement therewith and also for vertical movement relative to the transfer bar means to and from a work-engaging position, said carriers being spaced apart lengthwise of said transfer bar means a distance corresponding to the distance between successive stations on said support, workpiece sensing means at each station adapted to assume a first position in response to the absence of a workpiece at the station and a second position in response to the presence of a workpiece at the station, one link of each parallelogram linkage comprising a bell crank pivotally supported between its ends on the transfer bar means and having one end pivotally connected to said carrier, means operably connecting each sensing means with the carrier at the next upstream station and responsive to vertical upward movement of the transfer bar means to raise the carrier relative to the transfer bar means to its work-engaging position when the sensing means operably connected therewith assumes said first position, and means interconnecting the successive carriers for raising all of the carriers on the transfer bar means which are located upstream from the carrier raised by the sensing means at the last empty downstream station, said carriers being adapted to lift workpieces off the support rails when the transfer bar means are fully raised and to advance the lifted workpieces downstream and deposit them on the support at the next downstream station in response to advancing and lowering the transfer bar means, said operable connection between said sensing means and a carrier including a member movably mounted on said support at each station, said member lying in the vertical path of travel of said other end of the associated bell crank when the associated sensing means assumes said first position such as to pivot said parallelogram linkage to raise the carrier on the transfer bar means in response to upward movement of the transfer bar means, each sensing means when in said second position causing the associated movable member to assume a bypassing position relative to said other end of the associated bell crank when the transfer bar means is raised.

2. An accumulating conveyor as called for in claim 1 wherein said movable members are pivotally supported on said support.

3. An accumulating conveyor as called for in claim 1 wherein said sensing means engages and shifts the associated movable member to said bypassing position when the sensing means moves from said first to said second position.

4. An accumulating conveyor as called for in claim 1 wherein each sensing means comprises a lever pivotally supported between its ends on said support, said lever assuming said first position in response to gravity when its associated station is empty, said lever having one end thereof engaged by a workpiece present at its associated station to pivot said lever to said second position.

5. An accumulating conveyor as called for in claim wherein said movable members comprise cam levers pivotally supported on said support rails, the other end of said sensing levers being adapted to engage and pivot said cam levers to said bypassing position when the sensing levers pivot from said first to said second position.

6. An accumulating conveyor as called for in claim wherein the movable members comprise levers pivotally supported on said support, said levers having a cam portion thereon which, when the associated sensing means is in said first position, lies in the vertical path of travel of said other end of the associated bell crank thereby pivot the bell crank and the parallelogram linkage in a direction to raise the associated carrier in response to raising of the transfer bar means.

7. An accumulating conveyor as called for in claim including means for retaining said cam levers in the vertical path of travel of said other ends of said bell cranks when the sensing means is in said first position.

8. An accumulating conveyor as called for in claim wherein said support comprises a pair of laterally spaced rails and the transfer bar means extends lengthwise therebetween.

9. An accumulating conveyor as called for in claim wherein the successive bell cranks and the associated cam levers are spaced apart lengthwise of the conveyor to correspond with the spacing between successive stations and are located alternately on opposite sides the transfer bar means.

* * * * *